United States Patent [19]
Lawrance et al.

[11] Patent Number: 5,636,565
[45] Date of Patent: Jun. 10, 1997

[54] EMBOSSING METHOD AND DEVICE FOR BRAILLE CURRENCY ENCODING

[76] Inventors: Michael Lawrance, 1504 Chapman Oak Ct., Kissimmee, Fla. 34747; Jeffrey Mear, 2 East Mountain Rd., Katonah, N.Y. 10536; Dennis H. Dreier, 7705 Apple Tree Cir., Orlando, Fla. 32819

[21] Appl. No.: 572,649

[22] Filed: Dec. 14, 1995

[51] Int. Cl.$^6$ ............................. B31F 1/07; B41J 3/32
[52] U.S. Cl. ............................. 101/32; 400/109.1
[58] Field of Search .................. 101/32, 18; 400/122, 400/109.1

[56] References Cited

U.S. PATENT DOCUMENTS

| | | | |
|---|---|---|---|
| 3,765,285 | 10/1973 | Achler et al. | 83/128 |
| 4,096,655 | 6/1978 | Ullman, Jr. | 40/2 R |
| 4,204,468 | 5/1980 | Harrison | 101/3 SP |
| 5,178,067 | 1/1993 | Collier | 101/405 |
| 5,251,758 | 10/1993 | Ivo Kolacek | 206/542 |
| 5,449,240 | 9/1995 | Dorpfeld et al. | 400/427 |

*Primary Examiner*—Edgar S. Burr
*Assistant Examiner*—Dave Ghatt
*Attorney, Agent, or Firm*—American Innovations, Inc.; Dorothy S. Morse, Esq.

[57] ABSTRACT

An embossing method for marking braille numbers on currency notes wherein the embossing device used by the present invention has a universal female die permanently affixed to its upper platen and interchangeable lower counters for use in marking labels to affix to currency notes or for embossing braille markings directly on currency notes. The universal female die would collectively incorporate indentations for the braille markings of all of the currency denominations commonly used, such as one dollar bills, five dollar bills, ten dollar bills, twenty dollar bills, fifty dollar bills, and one hundred dollar bills. The interchangeable lower counters could comprise braille images placed on a rotating disk or individual counter units. Applications could include, but are not limited to, marking United States currency notes, the currency notes of other nations, and currency note substitutes such as checks, coupons, travelers checks, and money orders for the benefit of visually challenged people.

6 Claims, 6 Drawing Sheets

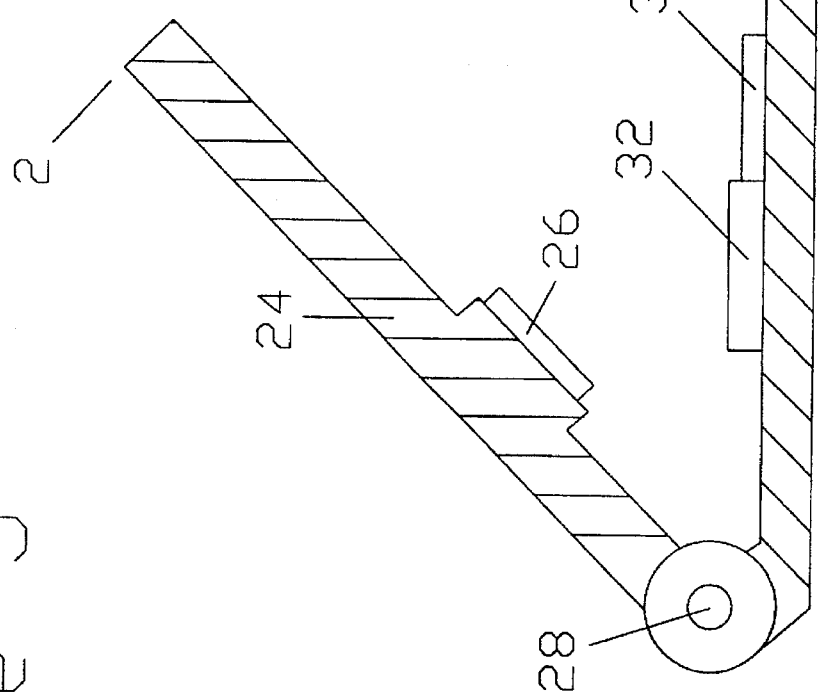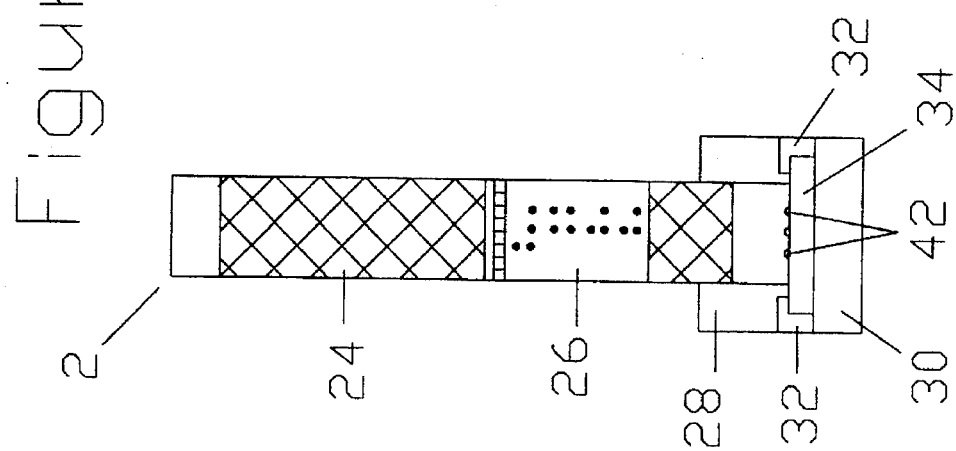

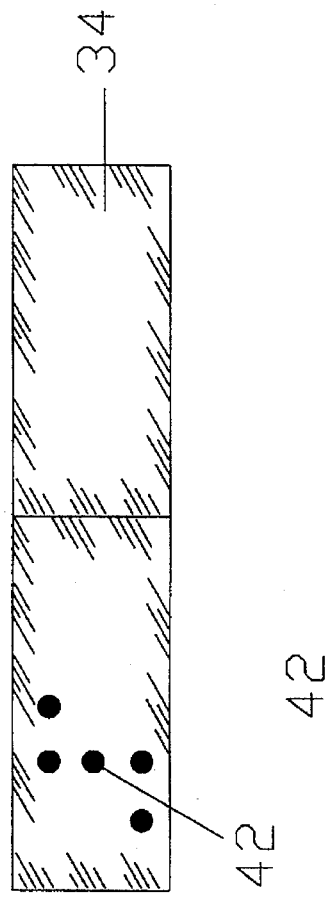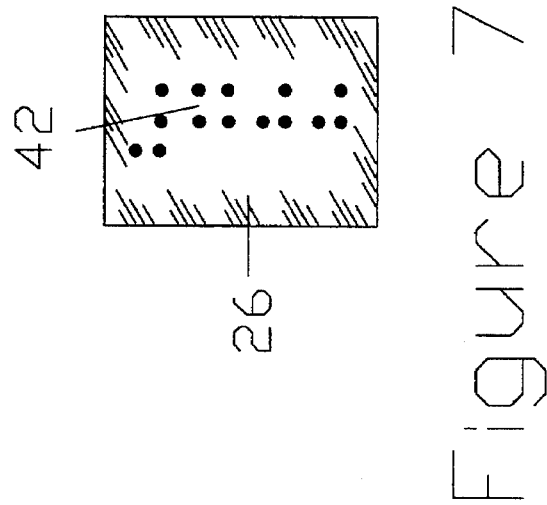

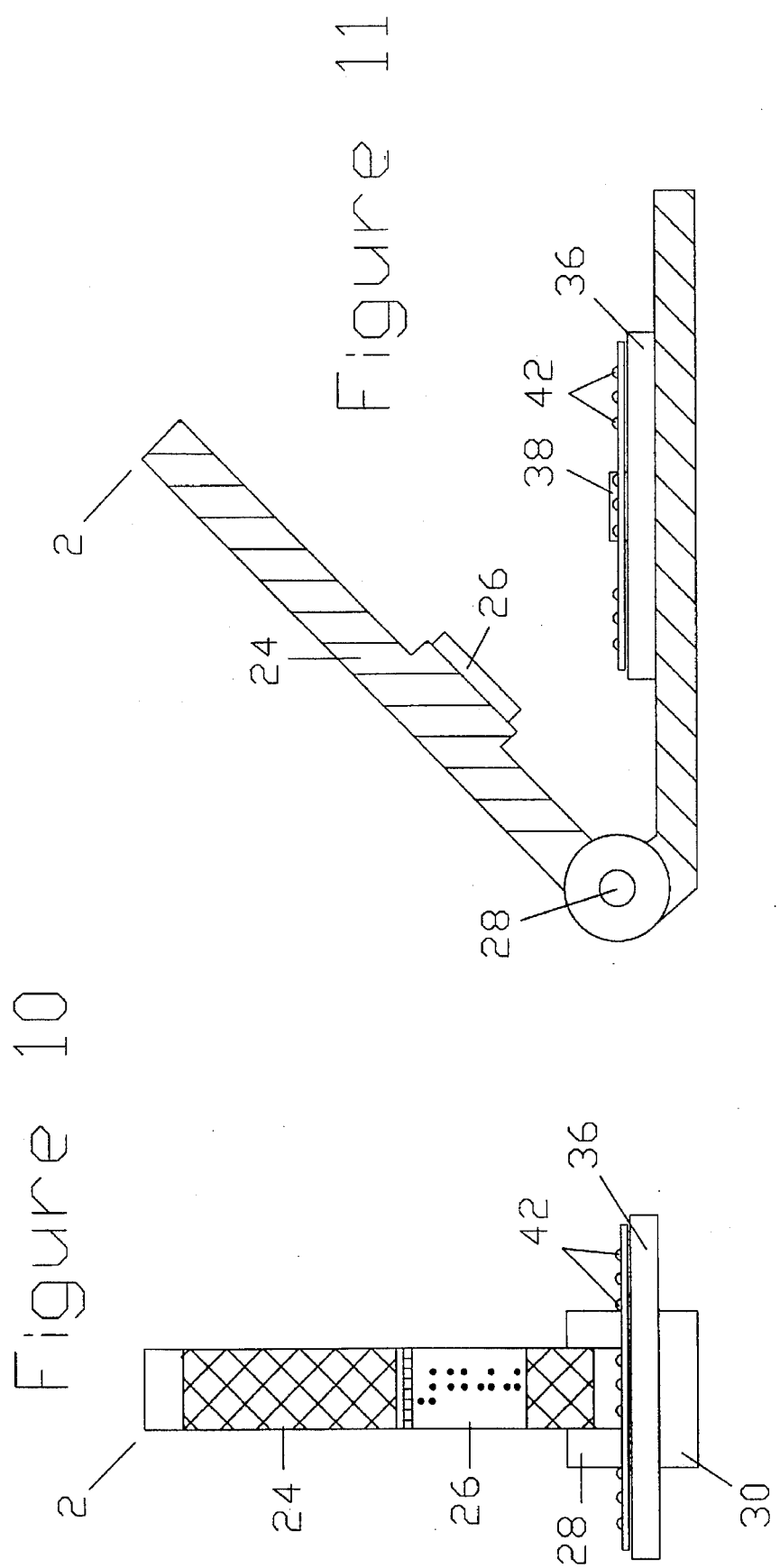

6,636,565

EMBOSSING METHOD AND DEVICE FOR BRAILLE CURRENCY ENCODING

BACKGROUND—FIELD OF INVENTION

This invention relates to embossing devices, specifically to a method for placing embossed braille markings on currency notes by marking labels to affix to currency notes. Applications could include, but are not limited to, marking United States currency notes, the currency notes of other nations, and currency note substitutes such as checks, coupons, travelers checks, and money orders for the benefit of visually challenged people.

BACKGROUND—DESCRIPTION OF PRIOR ART

It is well known to have hand-held embossing devices. For example, Notary Publics have been known to use them for marking their seal on documents to validate signatures. Also, corporations are known to have embossing seals for use in marking a corporate name on official corporation documents. The hand-held embossing devices routinely used by both Notary Publics and corporations, use permanently affixed upper and lower dies to emboss a single mark upon all documents. It has also been contemplated to emboss braille markings directly on currency notes to aid blind and visually impaired persons in the use of such currency notes. However, it is not known to have a method for marking braille numbers in combination with non-braille number equivalents, on currency notes using an embossing device with a universal female die permanently affixed to its upper platen and interchangeable lower counters for use in marking labels to affix to currency notes so that visually challenged people may be able to use his or her sense of touch to distinguish between the different denominations of currency notes since current methods to distinguish between denominations in currency are usually applicable to only one nation's currency and are not applicable to currency substitutes.

SUMMARY OF INVENTION—OBJECTS AND ADVANTAGES

It is the primary object of this invention to provide an embossing method for marking individual currency notes with braille numbers so that a visually challenged person may be able to distinguish between the different denominations of currency notes. It is a secondary object of this invention to provide an embossing method for marking currency note substitutes such as checks, coupons, travelers checks and money orders with braille numbers. It is also an object of this invention to provide an embossing method for marking individual currency notes with braille numbers to help visually challenged people feel more comfortable and confident in financial matters. A further object of this invention is to provide an embossing method for marking individual currency notes with braille numbers to help visually challenged people be able to assert more independence in transacting purchases. It is also and object of this invention to provide an embossing method which would provide braille markings and non-braille number equivalents on labels for attachment to currency notes and currency note substitutes so that a trusted friend of a visually impaired person in applying the correct embossed labels to the correct corresponding denominations.

As described herein, properly manufactured and used, the present invention would provide a method by which visually challenged people may mark currency notes for later identification and use. A visually challenged person may use the present invention to either place an embossed, adhesive-backed label on currency notes or to emboss braille markings directly on currency notes. Since the present invention uses an embossing device with a universal female die permanently affixed to its upper platen and six interchangeable lower counters for marking the numbers one, five, ten, twenty, fifty, and one hundred on currency notes, it reduces the expense of embossing currency notes for visually impaired people. With the current invention, only one embossing device is required for marking all six denominations, whereas with prior art embossing devices, six would have been required, one for marking each of the commonly used United States currency denominations. When using as a plastic clam shell-style embossing device, the present invention would provide an inexpensive embossing device available to nearly all visually challenged people for marking braille numbers on currency notes and currency note substitutes. Since non-braille number equivalents are also provided on labels, a visually impaired person could have a trusted person who is not familiar with braille markings could identify currency notes and mark them with the corresponding braille denomination markings. Another alternative would be for the visually impaired person to have a banking institution bundle currency notes into different denominational groups for later marking by the visually impaired person. It is also contemplated for banking institutions to provide a braille marking service for its visually impaired customers. The banking institution could also incorporate an embossed logo, or message, into the braille denomination marking if it so desired. In addition, it is contemplated for the present invention to use an embossing device with an optical reader for identifying the denominational marking on various currency notes which would then position the corresponding lower counter for use in marking the correct braille denomination on the currency note. It is further contemplated for the present invention to use an embossing device which would have an audio response mechanism to emboss currency notes with corresponding braille markings according to voice commands.

The description herein provides preferred embodiments of the present invention but should not be construed as limiting the scope of the currency embossing invention. Variations in size of the embossed markings produced, the type of material from which the embossed currency labels are made, and the thickness of the embossed markings made, other than those shown and described herein, can be incorporated into the present invention. Thus the scope of the present invention should be determined by the appended claims and their legal equivalents, rather than the examples given.

BRIEF DESCRIPTION OF THE DRAWINGS

FIG. 5 is a front view of the embossing device used by the invention having a universal die permanently affixed to its upper platen.

FIG. 6 is a side view of the embossing device used by the invention having interchangeable embossing plates attached to its lower handle.

FIG. 7 is a perspective view of the universal female die of the embossing device used by the invention.

FIG. 8 is a top view of one of the interchangeable embossing plates of the embossing device used by the invention.

FIG. 9 is a side view of the interchangeable embossing plate shown in FIG. 8.

FIG. 10 is a perspective view of the invention having a rotating lower disk.

FIG. 11 is a side view of the embossing device used by the invention having a rotating lower disk.

DETAILED DESCRIPTION OF PREFERRED EMBODIMENTS

Figure 1:
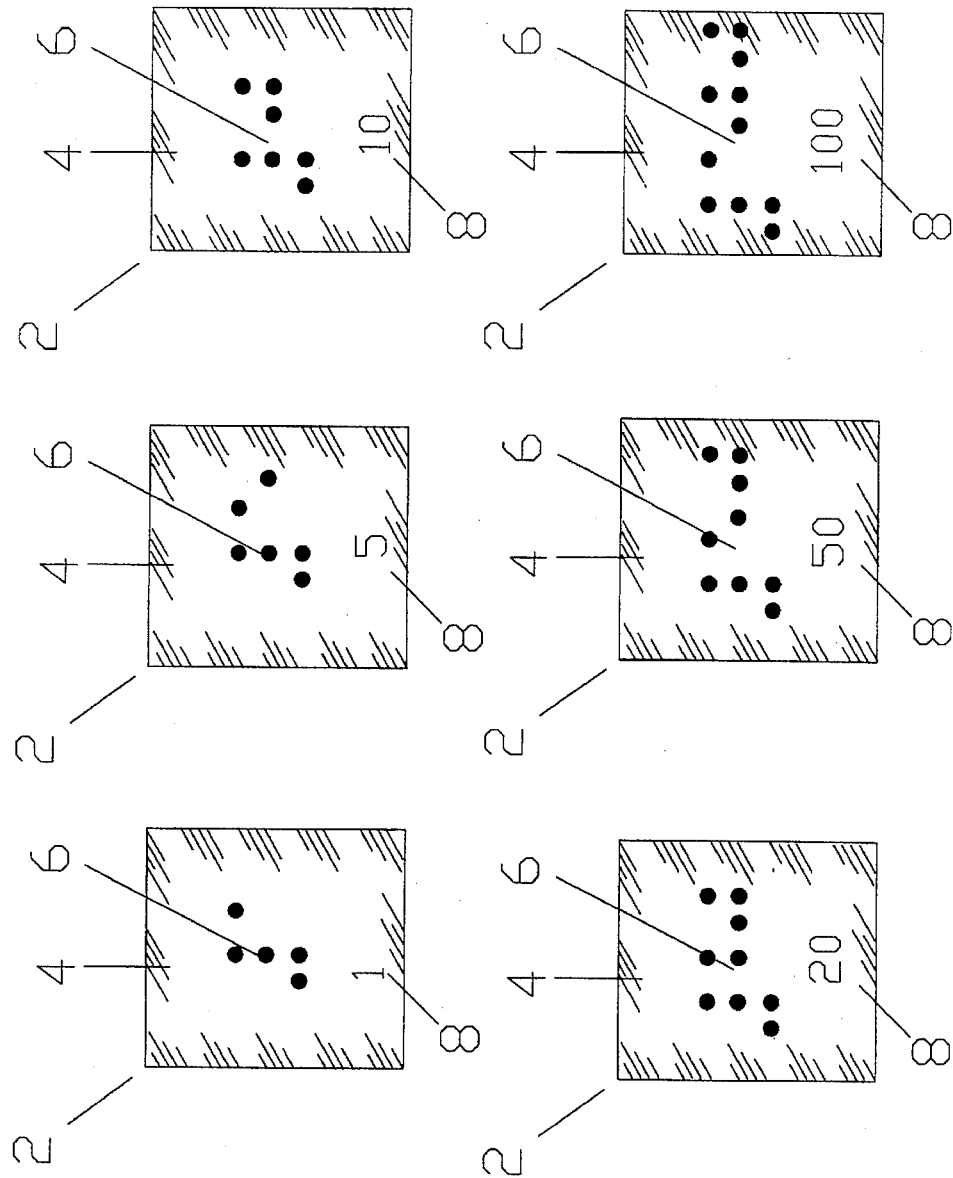
FIG. 1 is a perspective view of the embossed labels marked with braille numbers provided by the invention.
Figure 2:
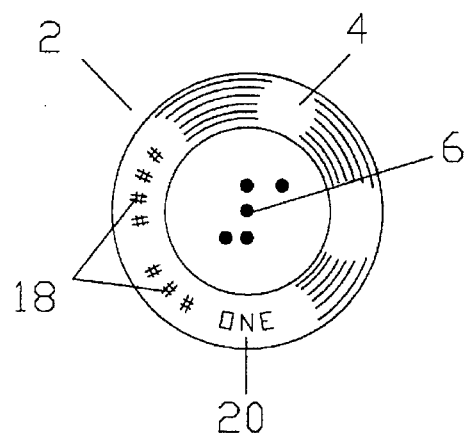
FIG. 2 is a perspective view of a label provided by the invention which includes a centrally located braille number and identifying words around its perimeter.
Figure 3:
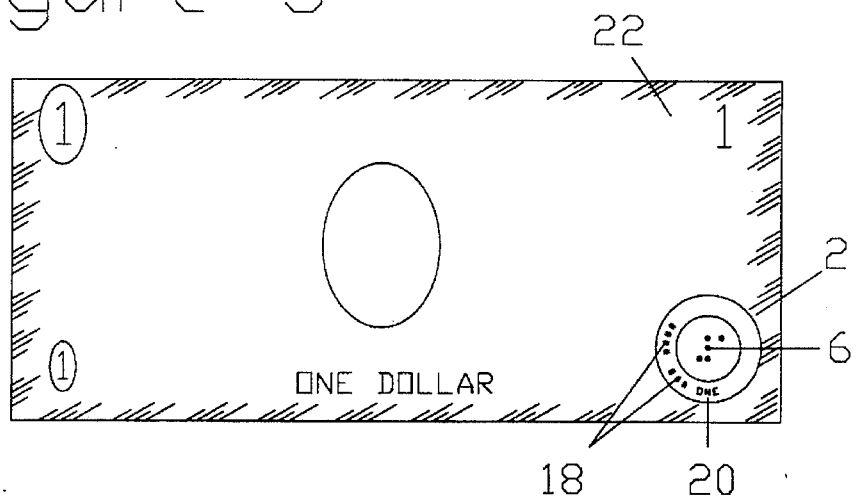
FIG. 3 is a perspective view of the label described in FIG. 2 attached to a currency note.
Figure 4:
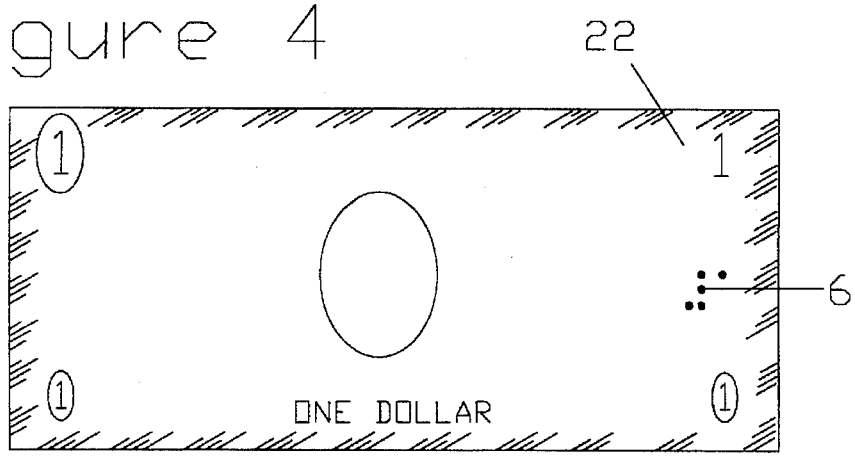
FIG. 4 is a perspective view of a marking provided by the invention directly embossed into a currency note.

FIG. 1 relates to a first embodiment of the method of the present invention and shows six embossed labels 4 for placing braille number markings 6 on currency notes 22, which are shown in FIGS. 3 and 4. Each embossed label 4 has a braille number marking 4 adjacent to a non-braille number marking 8. In the preferred embodiment non-braille number 8 is also placed on embossed label 4 so that a person not able to distinguish between different braille numbers markings 4 may be able to place the correct embossed label 4 upon corresponding currency notes 22. Although embossed labels 4 as shown in FIG. 1 are shaped as a square, it is contemplated for other shapes to be used, such as circles, rectangles, pentagons, hexagons, octagons, and dodecagons. FIG. 2 shows embossed label 4 having braille number 4 centrally located and a written denomination identification 20 with other identifying words 18 placed around its perimeter. FIG. 3 shows the embossed label 4, as shown in FIG. 2, attached to a currency note 22. FIG. 4 relates to a second preferred embodiment of the method of the present invention and shows braille number marking 4 directly embossed upon currency note 22. Although markings for United States currency notes are shown, it is also contemplated to have markings for currency notes of other nations, and for currency note substitutes such as checks, coupons, travelers checks, and money orders.

FIG. 5 shows an embossing device 2 used by the present invention having an upper handle 24, a universal female die 26 attached to upper handle 24, and a lower handle 30 attached to upper handle 24 by a hinge 28. Clamps 32 attach an interchangeable embossing plate 34 to lower handle 30. It is contemplated for the present invention to use six interchangeable embossing plates 34, each having a different braille number image 42, one each for marking a one dollar bill, a five dollar bill, a ten dollar bill, a twenty dollar bill, a fifty dollar bill, and a one hundred dollar bill. FIG. 6 shows the present invention using an interchangeable embossing plate 34 attached to lower handle 30. Even though FIGS. 5 and 6 show the preferred embodiment of embossing device 2 using a clam shell-style configuration, it is contemplated for embossing device 2 to have other operational configurations.

FIG. 7 shows universal female die 26 having a braille number image 42 incorporating all six of the markings needed identify United States currency one dollar bills, five dollar bills, ten dollar bills, twenty dollar bills, fifty dollar bills, and one hundred dollar bills. FIGS. 8 and 9 show interchangeable embossing plate 34 having braille number image 42 which identifies a United States one dollar bill.

Figure 12:
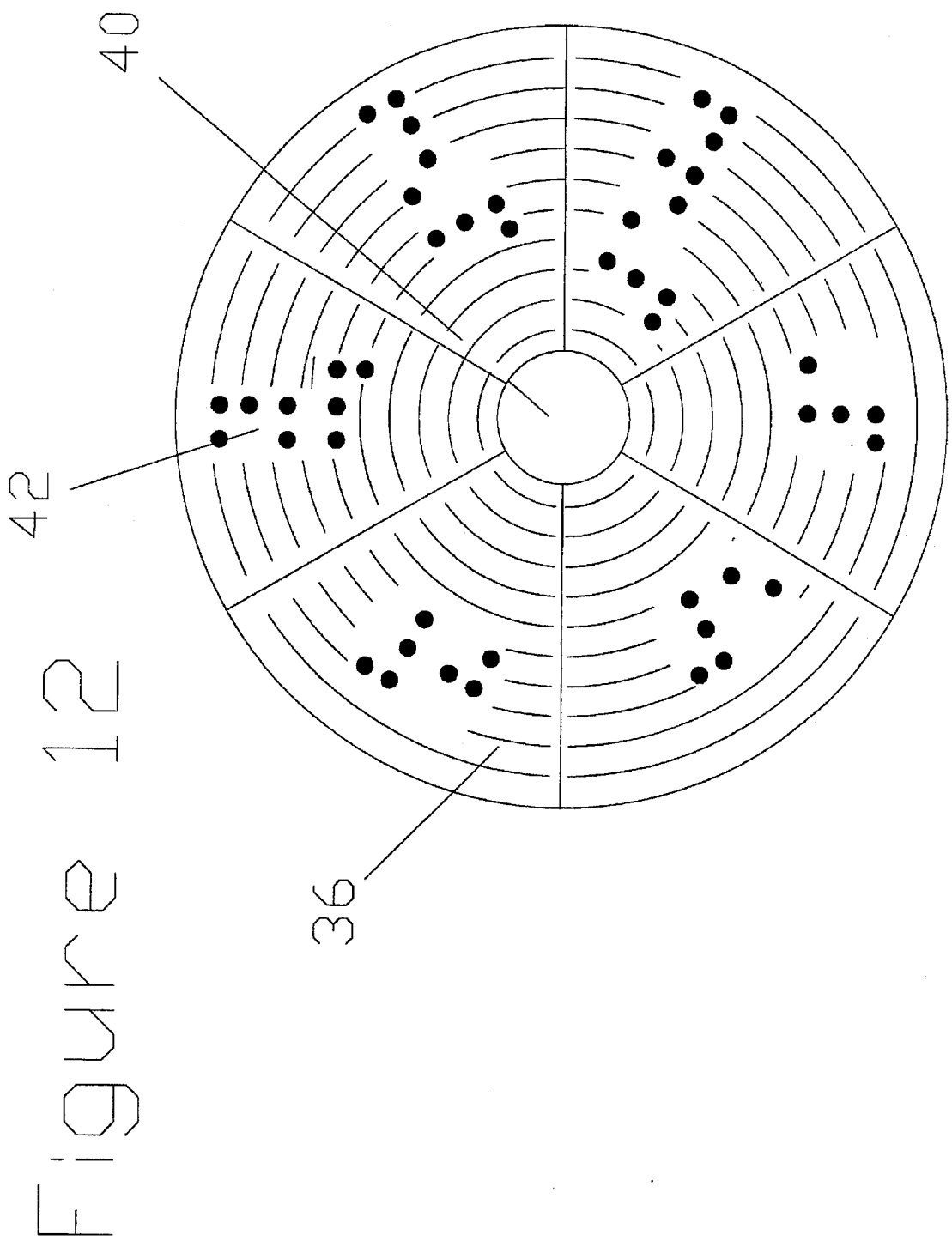
FIG. 12 is a perspective view of the rotating lower disk of the invention.

FIGS. 10, 11, and 12 show the present invention using a rotating lower disk 36 with an axial opening 40 and six braille number images 42, one each to mark a United States currency one dollar bill, a five dollar bill, a ten dollar bill, a twenty dollar bill, a fifty dollar bill, and a one hundred dollar bill. FIG. 11 also shows lower handle 30 having a spindle 38 upon which rotating lower disk 36 may be placed during use.

Although the material from which upper handle 24 and lower handle 30 is made is not critical to the embossing device used by the present invention, it is contemplated for upper handle 24 and lower handle 30 to be made of plastic. Also, even though embossing device 2 is described herein for marking currency notes with braille markings, it is contemplated for the method of marking currency notes with braille markings to include marking them with conventional embossing devices, one for each denomination required. In the preferred embodiment it is contemplated for raised braille markings 6 on embossed labels 4 to be approximately 0.015 inches in depth, while raised braille markings 6 directly stamped into currency notes 22 would be approximately 0.020 inches in depth. Although the material from which embossed labels 4 are made is not critical to the present invention, in the preferred embodiment it is contemplated for embossed labels 4 to be made of adhesive-backed foil, adhesive-backed paper, or adhesive-backed plastic. In the preferred embodiment, it is also contemplated for embossed labels 4 to be no larger than a one inch in diameter circle, and no larger than a one-half inch by one inch rectangle.

What is claimed is:

1. A method for embossing braille markings and non-braille number equivalents on a label for application to commonly used currency notes and currency note substitutes, hereinafter collectively referred to as notes, comprising the steps of providing at least one of said notes and a plurality of said labels; also providing at least one embossing device having an upper platen, at least one female die attached to said upper platen, and at least one lower counter corresponding with, and positioned to operate with, said female die to make embossed braille markings upon said labels positioned therebetween; identifying the number of different denominations of notes requiring braille markings; designating a group for each of said different denominations; identifying the denomination of each of said notes; separating each of said notes by denomination and placing each of said separated notes into the one of said groups corresponding to the denomination of said note; selecting a first group; identifying the number of notes in said first group; selecting the one of said female dies corresponding to said identified denomination of said first group and attaching said first female die against said upper platen; selecting the one of said lower counters corresponding to said first female die and positioning it in an opposed position to said first female die so as to operate with said first female die to make embossed braille markings; selecting a first quantity of said labels containing a number of said labels equal to said number of notes in said first group; positioning one at a time each of said labels in said first quantity between said first female die and said corresponding lower counter; applying opposed forces to said embossing device to compress said first female die and said corresponding lower counter against each of said labels in said first quantity so as to form a braille number marking and an equivalent non-braille number equivalent directly on each of said labels; to each of said notes in said first group affixing one of said labels in said first quantity; selecting each of said remaining groups one at a time; selecting the one of said female dies corresponding to said identified denomination of each of said remaining groups and attaching each of said remaining female dies one at a time against said upper platen; selecting the one of said lower counters corresponding to each of said remaining female dies and positioning each of said corresponding lower counters in an opposed position to said corresponding female die so as to operate with said corresponding female die to make embossed braille markings; counting the number of said notes in each of said remaining groups; selecting remaining quantifies of said labels each of said quantities containing a number of said labels equal to the number of notes in one of said remaining groups; positioning one of said labels at a time between said female die and said corresponding lower counter; applying opposed forces to said embossing device to compress each of said remaining female dies and said corresponding lower counter against said each of said labels in each of said remaining groups; and to each of said notes in each of said remaining groups also affixing one of said labels having braille markings and non-braille number equivalents corresponding to said denomination of said note.

2. The method of claim 1 wherein a plurality of conventional embossing devices are provided to place said braille markings on said labels so that each one of said conventional embossing devices provides the braille denomination marking required for a different one of said groups.

3. The method of claim 1 wherein each of said embossing devices is configured and dimensioned for easy hand-held operation.

4. The method of claim 1 further comprising the step of providing only one female die having braille markings for said denominations of all of said notes.

5. The method of claim 1 further providing the step of providing only one female die having braille markings for said denominations of all of said notes and further providing said interchangeable lower counters on a rotating disk.

6. The method of claim 1 wherein said labels are adhesive-backed for attachment to said notes.

* * * * *